United States Patent [19]
Secura

[11] 3,758,768
[45] Sept. 11, 1973

[54] MULTILAMP PHOTOFLASH ARRAY

[75] Inventor: Roy A. Secura, East Cleveland, Ohio

[73] Assignee: General Electric Company, Schenectady, N.Y.

[22] Filed: July 3, 1972

[21] Appl. No.: 268,734

[52] U.S. Cl. ............................................... 240/1.3
[51] Int. Cl. .......................................... G03b 15/02
[58] Field of Search ........................... 240/1.3, 37.1; 95/11; 431/92, 93, 95 R

[56] References Cited
UNITED STATES PATENTS

| | | | |
|---|---|---|---|
| 3,327,105 | 6/1967 | Kottler et al. | 240/1.3 |
| 3,598,985 | 8/1971 | Harnden et al. | 240/1.3 |
| 3,315,071 | 4/1967 | Pfefferle | 240/1.3 |
| 3,513,304 | 5/1970 | Ott | 240/1.3 |
| 2,817,399 | 12/1957 | Donaldson et al. | 240/108 R UX |

*Primary Examiner*—Fred L. Braun
*Attorney*—James J. Lazna et al.

[57] ABSTRACT

A multilamp photoflash array having a base and a rigid structured reflector unit with a protective cover therearound constituted solely of a light-transmitting plastic film tubing shrink-fitted tight around the reflector unit. The ends of the shrink-fitted tubing overlap the reflector unit and base to firmly hold them together. The array also has a supplementary cover adjacent to at least one end of the shrink-fitted tubing.

4 Claims, 6 Drawing Figures

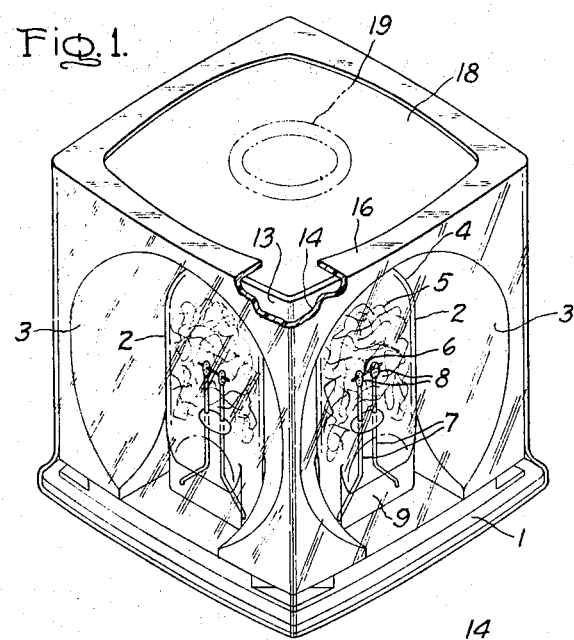
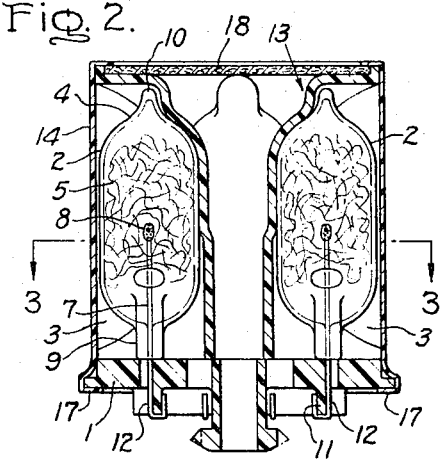
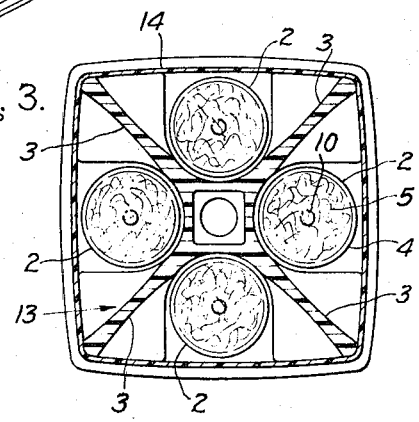
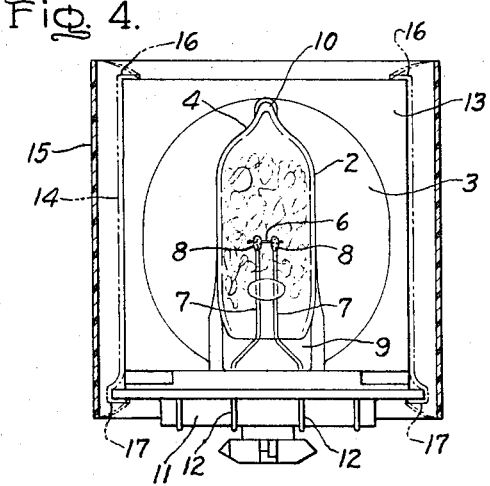

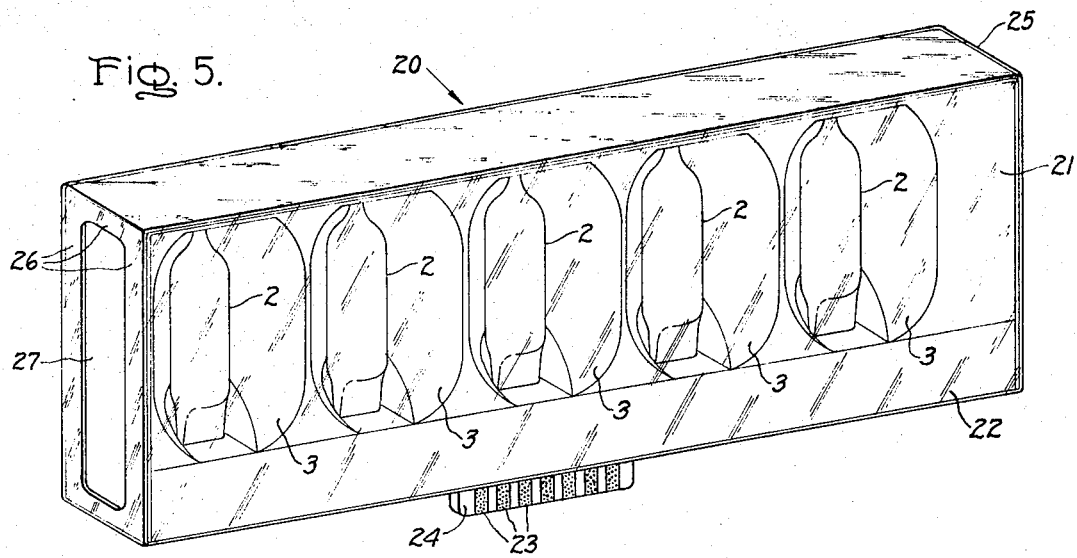
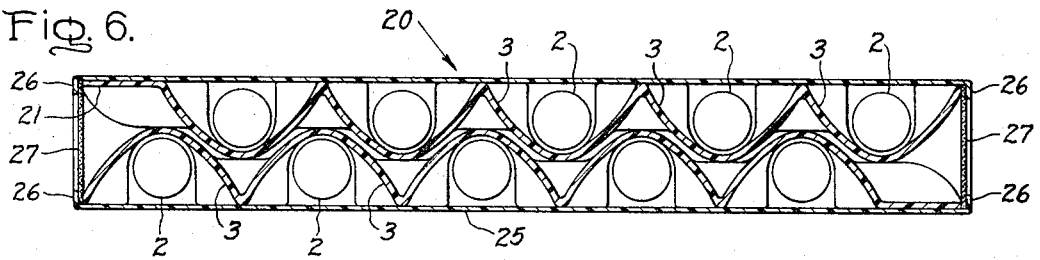

3,758,768

MULTILAMP PHOTOFLASH ARRAY

BACKGROUND OF THE INVENTION

1. Field of the Invention

This invention relates, in general, to multilamp photoflash arrays comprising a reflector unit formed with a plurality of adjacent reflectors each having a flash lamp mounted therein and, more particularly, to the light-transmitting protective cover for the reflectors of such arrays.

2. Description of the Prior Art

Multilamp photoflash arrays or assemblies comprised of a reflector unit having a plurality of adjacent reflectors or reflector cavities each having a photoflash lamp mounted therein are well known in the art. The conventional flashcube is one well-known embodiment of such photoflash lamp arrays. Linear type photoflash lamp arrays are also well known in the art wherein a series of reflectors are arranged in one or more rows which may face in the same direction to form a single-sided array or in opposite directions to form a two-sided array.

Such multilamp photoflash arrays or assemblies are customarily provided with a light-transmitting cover or shield to provide a protection from the elements and from exploding lamps, to maintain the position of the lamps in the reflector cavities, and also to prevent direct touching of the individual lamps of the array. Heretofore, these protective covers or shields have generally been in the form of a rigid molding of a suitable thermoplastic resin such as a cellulosic or polystyrene and having four or more side walls, a top wall, and an open bottom through which the reflector unit is inserted. These rigid molded plastic covers or shields are customarily affixed around their bottom edge to the base support element of the array by suitable means, as for example, by adhesive, heat-sealing or ultrasonic welding. Also, it is known to increase the containment strength of such molded plastic covers against the destructive force of a possible lamp explosion by means of a thin tubing of light-transmitting plastic film material shrink-fitted tight around the molded plastic cover.

Because it necessitates the carrying out of a separate molding operation, the production of the molded plastic covers are described above adds considerably to the overall manufacturing cost of the finished flash lamp array. Moreover, their being formed by a molding operation inherently necessitates these molded plastic covers being made of comparatively appreciable wall thickness which thus adds to the material cost of the individual covers.

SUMMARY OF THE INVENTION

It is an object of the present invention to provide a multilamp photoflash array having a protective cover which is inexpensive to produce and easy and inexpensive to apply to the array and which affords increased containment protection against exploding lamps over that afforded by the conventional molded plastic covers heretofore in general use on flashcubes.

Another object of the invention is to provide a multilamp photoflash array having a protective cover which eliminates the requirement for a separate molding operation therefor and which effects an appreciable saving in the cost thereof over the conventional molded plastic covers customarily employed heretofore.

Briefly stated, in accordance with one aspect of the invention, a multilamp photoflash array is comprised of, in combination, a rigid structured reflector unit having a plurality of individual reflectors, and a protective cover for the reflectors thereof constituted solely of a length of thin-walled shrink tubing of light-transmitting plastic film material shrink-fitted tight around the reflector unit. In its embodiments, the tubing axis is aligned transverse to the optical axes of the reflectors. According to another aspect of the invention, the shrunk plastic film tubing overlaps both the top and bottom of the array to form a tightly sealed package.

Further objects and advantages of the invention will appear from the following detailed description of species thereof and from the accompanying drawings.

BRIEF DESCRIPTION OF THE DRAWINGS

In the drawings,

FIG. 1 is a perspective view of a photoflash lamp array of the so-called flashcube type provided with a protective cover according to the invention;

FIG. 2 is a vertical section of the flashcube of FIG. 1 taken through the optical axes of an opposed pair of the reflectors thereof;

FIG. 3 is a horizontal section of the flashcube taken on the line 3—3 of FIG. 2;

FIG. 4 is an elevational view illustrating the manner of application of the protective cover to the flashcube;

FIG. 5 is a perspective view of a photoflash lamp array of the two-sided linear type provided with a protective cover according to the invention; and FIG. 6 is a horizontal section of the linear photoflash array of FIG. 5.

DESCRIPTION OF THE PREFERRED EMBODIMENTS

Referring to FIGS. 1 to 3, the invention is there illustrated as embodied in a multilamp photoflash array of the so-called flashcube type comprising a substantially square base or platform 1 of a suitable insulating material such as polystyrene on which four flash lamps 2 are mounted, in upstanding relation, one adjacent each side thereof. Each flash lamp 2 has its own individual reflector 3 within the innermost part of which the lamp is mounted. The reflectors 3 are of generally parabolic curvature, as is customary.

Each flash lamp 2 comprises a tubular-shaped, hermetically sealed, light-transmitting glass envelope 4 within which a combustible such as a loosely distributed filling of shredded zirconium foil 5, a combustion-supporting gas such as oxygen at a suitable pressure of several atmospheres, and an ignition system are all disposed. In the particular case illustrated, the ignition system is of the electrical type comprising an ignition filament 6 disposed within the envelope 4 and electrically connected across the inner ends of a pair of lead-in wires 7 which are provided with coatings 8 of a suitable primer or fulminating material at the regions of their connection with the filament. The lead-in wires 7 are sealed through an external flattened press seal portion 9 formed on one end of the envelope 4, the other end of which is formed with an exhaust tip 10. The lead-in wires 7 extend endwise from the press seal 9 through openings in the base or platform 1 and are wrapped around a contact ring 11 integral with and depending from the underside of the base or platform 1 to form the electrical contacts for the lamps as shown at 12. The exterior surface of the light-transmitting envelope 4 of each flash lamp 2 is provided with the customary reinforcing lacquer film coating of a resin such as cellulose acetate, for example. As shown in FIG. 2, the flash lamps 2 are supported in upstanding position on the base or platform 1 with their flattened press seal ends 9 resting endwise on the upper surface of the base or platform 1.

As is generally customary in flashcubes and other multilamp photoflash arrays, all the reflectors 2 of the array shown in FIGS. 1–3 are formed as a unitary structure or composite reflector unit 13. For the purposes of the present invention, the reflector unit 13, in contrast with the comparatively flimsy and easily crushable type thereof conventionally employed heretofore in flashcubes, must be of a relatively rigid structured self-supporting character such as to be capable of withstanding, without collapsing, a considerable amount of contracting force applied circumferentially thereto. To this end, the reflector unit 13 may be formed as an injection molded body (FIG. 3) of an inexpensive thermoplastic resin such as polystyrene, for example, and the individual reflectors 3 of which are suitably provided with a specular reflective coating of a suitable metal such as aluminum, for instance, as by well-known metal vaporization vacuum deposition processes. Such injection molded rigid reflector units 13 are disclosed, for example, in U.S. Pat. No. 3,513,304, Ott, dated May 19, 1970 and in copending U.S. application Ser. No. 239,917, Anderson et al, filed Mar. 31, 1972 and assigned to the assignee of the present invention.

To provide a protection from possible exploding lamps and collection of dust and other particles from the ambient surroundings, to maintain position and alignment of the lamps in the reflector cavities, and also to prevent direct touching of the individual lamps of the array while they are still hot following their flashing, the array is provided with a light-transmitting protective cover or shield 14 to completely close off the reflector cavities, as is generally customary with such devices. In accordance with the invention, however, the protective cover or shield 14, in place of being comprised of the conventional rigid or self-supporting molded resin type generally employed heretofore, is constituted instead solely of a length of thin-walled so-called shrink tubing 15 (FIG. 4) of a suitable light-transmitting resin film material shrink-fitted tight around the rigid self-supporting reflector unit 13 and the lamps 2 positioned therein. For the purposes of the invention, the resin film material employed for the plastic tubing 15 may be any of those commonly employed for commercially available shrink tubing and having light-transmitting properties, and which will impart to the tubing the capability of being shrunk to an appreciably smaller size or diameter under certain processing treatment so as to contract tightly down onto and around the reflector unit 13 to form an effective protective cover 14 therefor. There are, of course, several different forms of plastic film shrink tubing commercially available at present. One form of such tubing, known as heat-shrinkable tubing, will shrink from its normal diameter when heated to a temperature appreciably above that of normal room ambient. Another form of such shrink tubing, which may be referred to as desiccative-type shrink tubing, contains as manufactured a certain amount of included water or other liquid which, when removed as by drying the tubing in air or otherwise, causes the shrinkage of the tubing from its original manufactured size to an appreciably smaller size or diameter. Of the various shrinkable tubes of this last-mentioned type, those commercially known as Celon shrinkable tubes manufactured by the Plastic Packaging Division of Thatcher Glass Manufacturing Company of Muscatine, Iowa, are preferred for the purposes of the present invention, such Celon shrinkable tubes being made from regenerated cellulose to which approximately 8 percent glycerine and a small amount of a benzoalkonium chloride preservative have been added. They are generally supplied in their water-included expanded condition, and they dry and shrink up to as much as 20 percent in diameter in a short time under room ambient conditions or at a slightly elevated temperature, e.g., around 60°C. Such desiccative-type shrinkable tubes may have a film or material thickness of around 3 mils, for example. Suitable shrinkable plastic tubes of the heat-shrinkable type include those made of polyvinyl chloride (PVC) and having a film or wall thickness of around ¾ to 1 ½ mils, for example.

In applying the shrink tubing protective cover 14 to the flash lamp array, a predetermined length 15 of the unshrunk tubing is first placed or slipped over the reflector unit 13, as shown in FIG. 4, the tubing 15 being of sufficient size in its unshrunk state to loosely fit or slip over the reflector unit. Also, as shown, the unshrunk tubing 15 is of a length such as to extend, at its opposite ends, beyond the top of the reflector unit 13 and beyond the bottom side of the base or platform 1 of the array a sufficient distance to assure that the ends of the tubing 15 will shrink down onto and overlay or extend over onto the top of the reflector unit 13 and the bottom side of the base or platform 1 to form overlaps as shown at 16 and 17, respectively, when the plastic tube 15 is subsequently shrunk to its final condition to form the protective covering 14 for the array. The length of shrink tubing 15, while thus positioned in place over the assembled reflector unit 13 and platform 1 with its mounted flash lamps 2, is then subjected to the particular treatment required (i.e., heating or drying, depending on whether the shrink tubing 15 is of the heat-shrinkable type or of the desiccative shrink type) to effect the shrinking thereof down onto and around the assembly of the reflector unit 13 and platform 1, and around the top and bottom peripheral regions thereof, as shown in dotted lines at 16 and 17 in FIG. 4. The plastic film material of which the shrink tubing 15 is made is thus shrink-fitted tight around and over the reflector unit 13 and stretched taut over the individual reflector cavities 3 thereof, to thereby provide a sturdy protective covering 14 for the array completely closing off the reflector cavities 3 thereof from the surrounding atmosphere and firmly holding the reflector unit 13 and base support 1 together as a unit, as well as affording substantially increased impact strength and containment protection against exploding flash lamps 2 as compared to that afforded by the molded type thermoplastic resin covers heretofore conventionally employed on flashcubes.

Although the shrink tubing 15 can be shrunk down directly over and onto the top of the reflector unit 13 to close off the reflector cavities 3 from the surrounding atmosphere at their top ends, it is preferable to employ a supplementary cover panel 18, as shown in FIGS. 1-3, of suitable and relatively inexpensive material such as cardboard, paper, plastic sheet, etc., to substantially completely cover the top of the reflector unit 13. Such a supplementary top cover panel 18, besides improving the appearance of the finished flash lamp array, also affords a convenient means for applying any desired marking or advertising indicia onto the array, as shown at 19 in FIG. 1. Where such a supplementary cover layer 18 is employed, the plastic shrink tubing 15 is in such case shrunk down and over the top of the supplementary cover 18 so as to overlay it around its peripheral edges and securely hold it in place on the array, as clearly shown in FIG. 1.

Instead of employing a length of plastic shrink tubing 15 which is open at both ends, as shown in FIG. 4, the plastic shrink tubing 15 may be closed at its upper end and open only at its lower end, in which case the closed end tubing 15, when shrunk down onto the reflector unit 13, will itself completely encase the sides and top of the reflector unit. This form of the invention may be particularly useful for assuring the complete closing off of the reflector cavities 3 from the surrounding atmosphere in those cases where the walls of the reflector cavities are formed with openings or apertures therethrough at their top regions for one reason or another as, for example, where the array is also to be provided with flashed lamp indicator means in the form of heat-shrinkable colored plastic indicator strips or webs spanning such openings or apertures in the reflector top regions and shrunk by the heat from a flashed lamp 2 to provide an indication that the lamp has been flashed. Also, this closed end form of shrink tubing cover 14 may be used either with or without a supplementary cover 18.

FIGS. 5 and 6 illustrate the application of the invention to a so-called linear type array 20 comprised of one or more rows of side-by-side reflectors 3. In the particular case illustrated, two such reflector rows are employed facing in opposite directions to form a two-sided linear array as disclosed, for example, in U.S. Pat. No. 3,598,984, Slomski, dated Aug. 10, 1971. As in the form of the invention illustrated in FIGS. 1-3, all the reflectors 3 of the linear array 20 of FIGS. 5 and 6 are formed as a unitary structure or composite reflector unit 21 which, like the reflector unit 13 of FIGS. 1-3, is of a relatively rigid structured self-supporting type capable of withstanding, without collapsing, a considerable amount of contracting force applied circumferentially thereto. For such purpose, the reflector unit 21 may be formed either as a single injection molded body, or as a two-part injection molded body of an inexpensive resin such as polystyrene. Where of two-part form, the reflector unit 21 in such case may be of the type disclosed and claimed in copending U.S. application Ser. No. 239,917, Anderson et al, filed Mar. 31, 1972. As before, the individual reflectors 3 of the reflector unit 21 are suitably provided with a specular reflective coating of a suitable metal such as aluminum, as by well-known metal vaporization vacuum deposition processes, for example. The individual flash lamps 2 of the linear array 20 are mounted on an elongated molded plastic base support member 22 within respective ones of the reflector cavities 2 of the reflector unit 21 which, as shown, rests on the base support member 22. The lead-in wires 7 of the flash lamps 2 in the array 20 are electrically connected to respective terminal contact strips 23 on a contact tab 24 projecting from the bottom side of the base support member 22.

In accordance with the invention, the linear array 20 of FIGS. 5 and 6, like the flashcube array shown in FIGS. 1-4, is provided with a protective cover or shield 25 constituted solely of a length of thin-walled so-called shrink tubing 15 of a suitable light-transmitting resin film material the same as that employed for the cover 14 in FIGS. 1-4. The shrink tubing is slipped lengthwise over the assembled reflector unit 21 and base support member 22, with a suitable slotted opening in the wall thereof accommodating therein the contact tab 24 projecting from the base support member 22, and the tubing then shrunk so as to be shrink-fitted tight around the reflector unit 21 and base support 22, with its opposite ends overlapping the ends of the reflector unit and base support to form the end overlaps 26. The shrunk fit tubing or cover 25 thus completely closes off the reflector cavities 3 of the array 20 from the surrounding atmosphere and firmly holds the reflector unit 21 and base suport member 22 together as a unit besides affording substantially increased impact strength and containment protection against exploding flash lamps 2 as compared to that afforded by the molded type thermoplastic resin covers heretofore employed for such purpose. As in the previous form of the invention, a supplementary top and end cover panel 27 of paper, cardboard, plastic sheet, or other suitable inexpensive material, is preferably employed to substantially completely cover the top and opposite ends of the reflector unit 21, for appearance improvement of the finished array 20 and also to afford a convenient means for applying any desired marking or advertising indicia thereto. Where such a supplementary cover 27 is employed, the plastic shrink tubing in such case is shrunk down and around the opposite ends of the supplementary cover 27 and the base support member 22 so as to overlap them around the peripheral edges of their opposite end portions. The shrunk plastic tube covering 14 or 25 may be suitably tinted as by the incorporation of a blue dye in the material of which it is constituted to provide a color-correcting filter for enhancing the photographic quality of the light emitted by the assembly.

In the appended claims, the expression "plastic tubing" is intended to embrace tubing which is either open at both ends, or open at one end only with its other end closed.

What I claim as new and desire to secure by Letters Patent of the United States is:

1. A multilamp photoflash assembly comprising a base, a rigid structured reflector unit mounted on said base and having a plurality of outwardly facing reflectors, a plurality of photoflash lamps mounted on said base, each one of said lamps being positioned within a respective one of said reflectors, a protective covering over the said reflectors constituted of a length of plastic tubing of thin light-transmitting plastic sheet material shrink-fitted tight around said reflector unit, said tubing being open at both ends with its axis extending transverse to the optical axes of said reflectors wherein the ends of said shrink-fitted tubing overlap the base and reflector unit to firmly hold them together, and supplementary cover means disposed adjacent to at least one end of said shrink-fitted tubing.

2. A multilamp photoflash assembly as specified in claim 1 wherein the said reflector unit comprises four reflectors arranged adjacent and respectively facing outwardly in four 90° apart directions in one plane to form four sides of a cube.

3. A multilamp photoflash assembly as specified in claim 1 wherein the said reflector unit comprises a linear row of reflectors arranged side-by-side and facing outwardly in the same direction.

4. A multilamp photoflash assembly as specified in claim 1 wherein the said reflector unit comprises two rows of reflectors arranged back-to-back and facing outwardly in opposite directions.

* * * * *